Patented Jan. 6, 1942

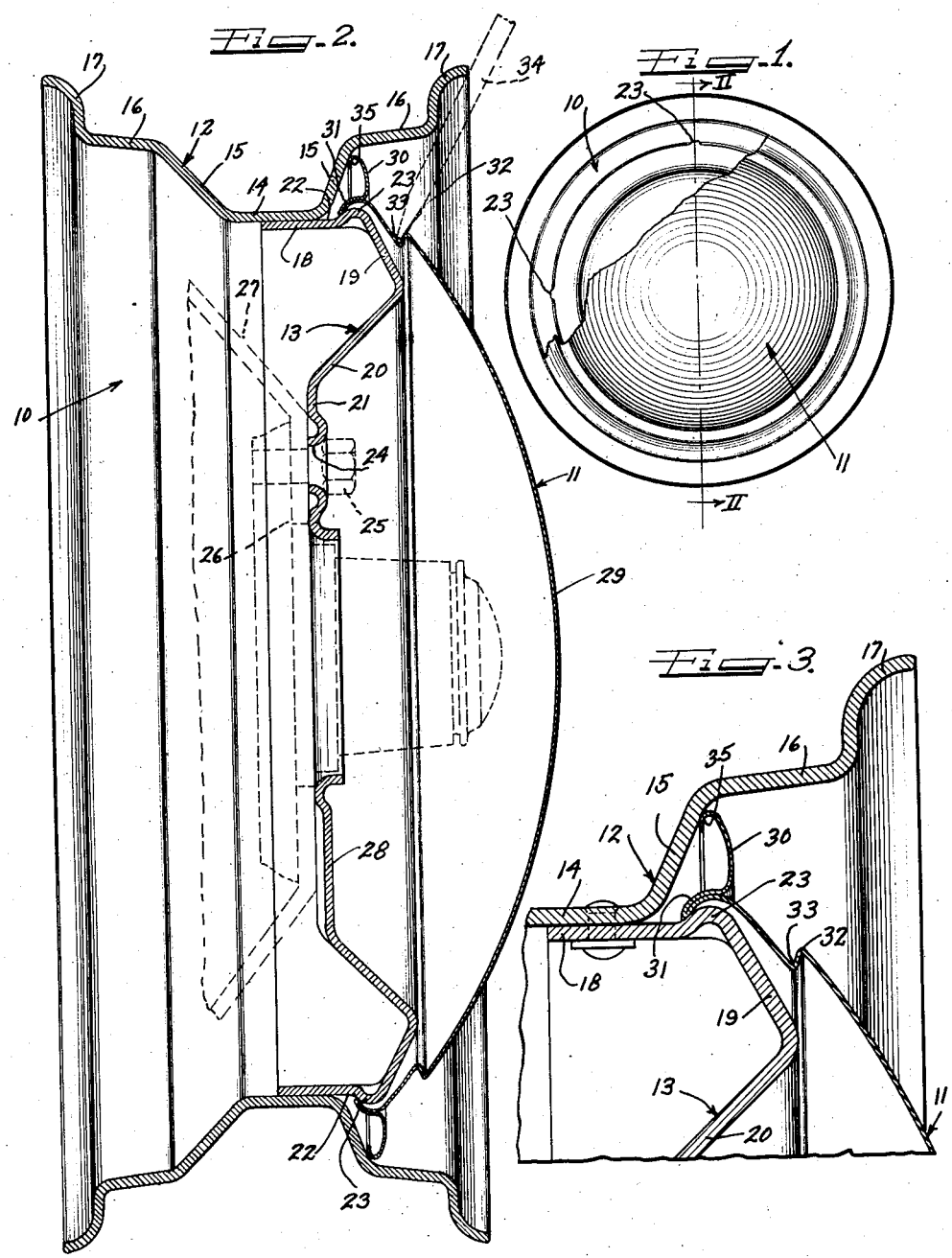

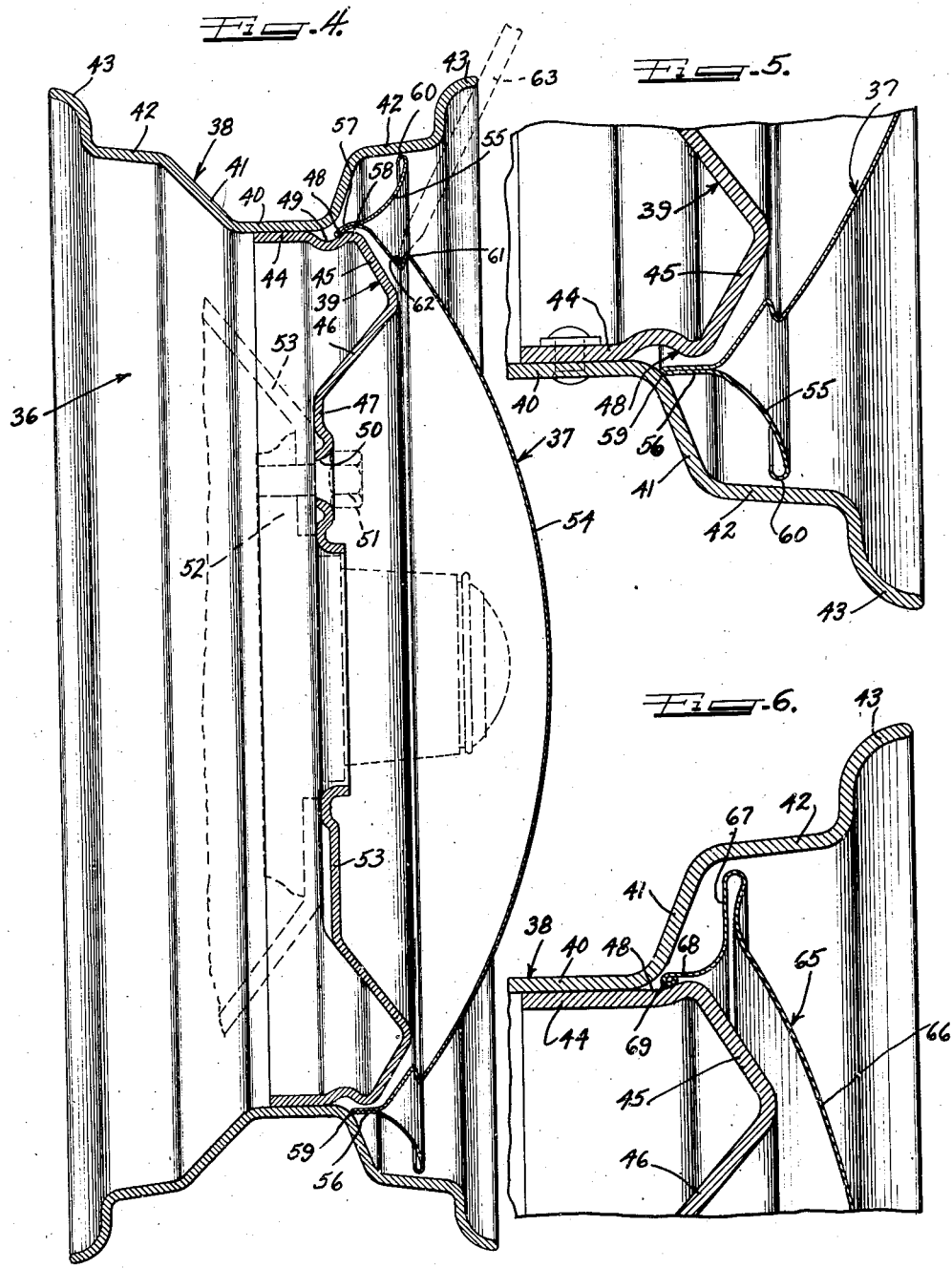

2,268,839

UNITED STATES PATENT OFFICE 2,268,839

WHEEL DISK AND ASSEMBLY

George Albert Lyon, Allenhurst, N. J.

Application October 6, 1939, Serial No. 298,219

12 Claims. (Cl. 301—37)

This invention relates to a novel wheel disk and wheel assembly, and more particularly to one in which a wheel disk is mounted on and secured to a wheel without the use of any of the usual form of spring fingers or the like.

It is an object of the present invention to provide a novel form of wheel disk and wheel assembly which is economical to manufacture and which is rugged and reliable in use.

It is another object of the present invention to provide a novel wheel disk which is seated on and secured to a vehicle wheel in a novel manner.

It is a further object of the present invention to provide a novel wheel and wheel disk assembly wherein the wheel disk has a circular fastening flange which is sprung into an annular pocket-like portion of a vehicle wheel to detachably secure the wheel disk thereon.

Another and further object of the present invention is to provide a novel wheel disk having a novel pry-off edge formed therein for facilitating the removal of the wheel disk from the wheel.

Another and still further object of the present invention is to provide a novel wheel and wheel disk assembly wherein the wheel disk is seated on the wheel in a novel manner.

The novel features which I believe to be characteristic of the present invention are set forth with particularity in the appended claims. My invention itself, however, both as to its organization and manner of construction, together with further objects and advantages thereof, may be best understood by reference to the following description, taken in connection with the accompanying drawings, in which:

Figure 1 is a front view of a vehicle wheel equipped with a wheel disk constructed and mounted on the wheel in accordance with the teachings of the present invention, a portion of the wheel disk being broken away to show the front face of the wheel;

Figure 2 is an enlarged cross-sectional elevational view taken along the line II—II of Figure 1;

Figure 3 is an enlarged fragmentary view of the upper portion of Figure 2;

Figure 4 is an enlarged cross-sectional elevational view similar to Figure 2 illustrating a different embodiment of the present invention;

Figure 5 is an enlarged fragmentary view of the lower portion of Figure 4 showing the manner in which the wheel disk is seated on the wheel; and Figure 6 is an enlarged fragmentary sectional view of a third embodiment of the present invention.

Referring now to the first embodiment of my invention which is illustrated in Figures 1 to 3 of the drawings, there is shown therein a wheel assembly comprising a vehicle wheel 10 and a wheel disk 11. The wheel 10 comprises a rim part 12 and a body part 13. The rim 12 is of the usual drop center type and includes a base flange 14, opposite intermediate side flanges 15, opposite intermediate base flanges 16, and opposite edge portions 17. The drop center rim 12 as illustrated is of the type which is commonly employed in the automotive vehicle art of the present day, and, as is well known to those skilled in the art, is arranged to receive and accommodate a pneumatic tire (not shown).

The body part 13 of the wheel 10 includes, in general, a rearwardly extending flange 18, an obliquely radially inwardly and axially forwardly web extending portion 19, an obliquely radially inwardly and axially rearwardly extending second web portion 20, and a radially inwardly extending wheel mounting flange 21. The rearwardly extending outer flange 18 is secured to the underside of the base flange 14 of the rim 10 in any suitable manner such as by riveting, welding, or the like. The flange 18 extends out axially forwardly beyond the base flange 14 of the rim 12 to form a radially outwardly facing shoulder 22. The shoulder 22 is provided with a plurality of circumferentially spaced protuberances 23 adjacent the junction of the flange 18 with the outer web portion 19.

The wheel mounting flange 21 is provided with an annular series of apertures 24 for the reception of the usual wheel mounting bolts 25 which are employed to detachably secure the wheel 10 to the axle mounting element 26 and brake drum 27. The radial fastening flange 21 is also provided with a plurality of pressed-out or raised portions 28 which are employed for the purpose of strengthening this flange in a manner well known to those skilled in the art.

The ornamental wheel disk 11 is shaped to cover substantially the entire outer face of the vehicle wheel 10 and includes in general a central dome shape portion 29 and an outer annular portion 30. A relatively tightly folded fastening flange 31 is formed in the wheel disk 11 at the junction of the outer annular portion 30 with the central dome shape portion 29. The fastening flange 31 is slightly curved to extend first generally axially rearwardly and then obliquely radially inwardly and axially rearwardly.

The wheel disk 11 is preferably formed of thin sheet metal stock. I have found that stainless steel having approximately 18% chromium and 8% nickel provides a very good type of material for this purpose. It is to be understood, however, that any sheet metal material may be employed which is suitable for the purpose without departing from the spirit and scope of the present invention.

As is clearly shown in Figures 2 and 3 of the drawings, the folded fastening flange 31 is arranged to be sprung over the protuberances 33 in the shoulder 22. The wheel disk 11 is thus held tightly secured on the outer face of the wheel by its own inherent resiliency. It is to be noted that the arcuate curving of the folded fastening flange 31 tends to stiffen this flange and provide a more satisfactory engagement of the wheel disk 11 on the wheel 10.

An annular pry-off edge 32 is provided in the wheel disk 11 by forming an annular re-entrant groove or channel 33 in the dome shape central portion 29 in close proximity to the flange 31 but spaced slightly radially inwardly and axially forwardly thereof. The annular pry-off edge 32 which is provided by the groove or channel 33 permits a tool 34 such, for example as a large screw driver, to be inserted therein for the purpose of removing the wheel disk 11 from the wheel 10. The pry-off tool 34 may be conveniently fulcrumed against the outer edge portion 17 of the rim 12 as is clearly shown in Figure 2 of the drawings.

The radial outer edge of the wheel disk 11 is preferably curled inwardly and arranged to be seated on the outer intermediate side flange 15 of the rim 12.

In Figures 4 and 5 of the drawings I have illustrated a second embodiment of the present invention. More specifically, I have illustrated a wheel and wheel disk assembly including a wheel 36 and a wheel disk 37. The wheel 36 comprises a rim part 38 and a body part 39. The rim 38 is of the usual drop center type and includes a base flange 40, opposite intermediate side flanges 41, opposite intermediate base flanges 42 and opposite edge portions 43. The drop center rim 28 is of the same general type as that shown in Figure 2 and is arranged to receive and accommodate a pneumatic tire (not shown).

The body part 39 of the wheel 36 includes, in general, a rearwardly extending outer flange 44, an obliquely radially inwardly and axially forwardly extending outer web portion 45, an obliquely radially inwardly and axially rearwardly extending inner web portion 46 and a radially inwardly extending wheel mounting flange 47. The rearwardly extending outer flange 44 extends axially forwardly beyond the base flange 40 of the rim 38 to form an outwardly facing shoulder 48. An annular groove or channel 49 is formed in the flange 44 which extends partly below the base flange 40 of the rim 38 and extends partly out into the shoulder portion 48 thereby providing an annular pocket-like formation in the wheel 36 at the junction of the wheel body part 39 with the rim 38.

The wheel mounting flange 47 is provided with an annular series of apertures 50 for the reception of the usual wheel mounting bolts 51 which are employed to detachably secure the wheel 36 to the axle mounting element 52 and the brake drum 53. The radially extending wheel mounting flange 47 is also provided with a plurality of pressed-out or raised portions 54 for the purpose of increasing the strength of this flange in a manner well known to those skilled in the art.

The wheel disk 37 includes a central dome shape portion 54 and an arcuately curved outer annular portion 55. Formed in the wheel disk 37 and integral therewith is a substantially tightly folded generally rearwardly extending fastening flange 56. As is clearly shown in the upper portion of Figure 4 the generally axially rearwardly extending fastening flange 56 is provided with a plurality of arcuately curved radially inwardly pressed portions 57. These pressed-in portions 57 are arranged to be sprung over the outer ridge-like portion 58 of the shoulder 48 to detachably secure the wheel disk 37 to the wheel 36 and to retain the wheel disk 37 on the wheel 36 by its own inherent resiliency. The rear edge 59 of the axially rearwardly extending folded flange 56 is arranged to be seated on the rim 38 within the pocket-like formation which is provided by the annular groove or channel 49 in cooperation with the base flange 40 of the rim 38. The radial outer edge 60 of the wheel disk 37 is curled inwardly to stiffen the outer edge of the wheel disk 37 and to provide an ornamental appearance therefor. This outer edge 60 of the wheel disk 37, however, is arranged to be spaced from the rim 38 even after the wheel disk 37 has been moved into mounted engagement on the wheel 36. From a careful inspection of Figure 4 it will be observed that the wheel disk 37 is seated on the wheel 36 solely at the junction of the rim 38 with the body part 39 of the wheel 36. It will furthermore be noted that this seating engagement occurs substantially in the pocket-like formation provided by the channel or groove 49 in the outer axially extending flange 44 and between the base flange 40 of the rim 42.

A pry-off edge 61 is provided in the wheel disk 37 by forming an annular re-entrant groove or channel 62 in the central dome shape portion 54 thereof. This annular groove 62 and pry-off edge 61 is arranged to receive a pry-off tool 63 such, for example, as a screw driver. It will thus be understood that the wheel disk 37 may be quickly and conveniently removed from the wheel 36 by simply inserting the edge of the pry-off tool 63 into the groove 62 and causing the end of the tool 63 to be forced against the pry-off edge 61 by fulcruming the tool 63 on the axial outer edge portion 43 of the rim 38.

In Figure 6 of the drawings, I have illustrated a third embodiment of the present invention which is a modified form of the arrangement shown in Figure 4. In this form of the invention portions of the wheel which correspond to similar portions in Figure 4 have been given the same reference characters.

In the embodiment of the invention illustrated in Figure 6, the outer axially extending flange 47 instead of being provided with a groove or a channel 48 as shown in Figure 4 for the purpose of providing a pocket-like formation, is provided with a raised ridge 64 in the shoulder 48 adjacent the outer web portion 45. This ridge portion 64 in the shoulder 48 in conjunction with the outer intermediate side flange 41 of the rim 38 provides a pocket-like formation in the wheel.

A wheel disk 65 is provided which includes a central dome shape portion 66 whose outer marginal portion is bent back on itself in a radially inwardly extending portion 67, and is then bent axially rearwardly in a fastening flange 68. The rear edge of the fastening flange 68 is curled inwardly to form a tightly rolled edge 69. This tightly rolled edge 69 is arranged to be sprung over the ridge 64 in the shoulder 48 thereby to tightly secure and retain the wheel disk 65 on the wheel by virtue of its own inherent resiliency. It will furthermore be observed that this holding engagement is obtained within the pocket-like formation provided by the ridge 64 in conjunction with the rim 38.

In both the form of the invention illustrated in Figure 4 and the form of the invention illustrated in Figure 6 the wheel disks 37 and 65 respectively are preferably formed of thin sheet metal material. I have found that a stainless steel having approximately 18% chromium and 8% nickel provides a very good type of material for this purpose. It is to be understood, however, that any sheet metal material may be employed which is suitable for the purpose without departing from the spirit and scope of the present invention.

While I have shown particular embodiments of my invention, it will, of course, be understood, that I do not wish to be limited thereto, as many modifications may be made, and I, therefore, contemplate by the appended claims to cover all said modifications as fall within the true spirit and scope of my invention.

I claim as my invention:

1. An article of manufacture comprising a circular sheet metal member for disposition on the outer face of a wheel and having central and outer portions joined by an integral folded fastening flange portion, said central portion having an annular open fold therein forming a circular pry-off edge for reception of a pry-off tool.

2. An article of manufacture comprising a circular sheet metal member for disposition on the outer face of a wheel, said member having central and outer portions joined by an integral generally axially rearwardly extending folded fastening flange portion, said folded flange portion being disposed in close proximity to the radial outer edge of said member, and said central portion having a radially outwardly facing groove formed therein for providing a circular pry-off edge to receive a pry-off tool.

3. An article of manufacture comprising a circular sheet metal member for disposition on the outer face of a wheel, said member having central and outer portions joined by an integral generally axially rearwardly extending folded fastening flange portion, said folded flange portion being disposed in close proximity to the radial outer edge of said member, and said central portion having a radially outwardly facing groove formed therein for providing a circular pry-off edge to receive a pry-off tool, said radially outwardly facing groove being disposed in close proximity to said folded flange portion but on the opposite side of the member therefrom.

4. The combination comprising a wheel having rim and body parts, said rim part including a base flange and said body part including an axially extending flange upon which said base flange is seated and secured, said body part flange extending axially forwardly beyond said base flange of said rim and providing a radially outwardly facing shoulder, said shoulder having radially outwardly projecting portions thereon faced axially forwardly of the portion of said rim part lying opposite thereof, and a wheel cover member for disposition on the outer face of said wheel having an intermediate annular folded flange sprung over said projecting means on said shoulder, and the radial outer edge of said cover member being seated on said rim part.

5. The combination comprising a wheel having rim and body parts, said rim part including a base flange and said body part including an axially extending flange upon which said base flange is seated and secured, said body part flange extending axially forwardly beyond said base flange of said rim and providing a radially outwardly facing shoulder, said shoulder having radially outwardly projecting portions thereon faced axially forwardly of the portion of said rim part lying opposite thereof, and a wheel cover member for disposition on the outer face of said wheel having an intermediate annular folded flange sprung over said projecting means on said shoulder, and the radial outer edge of said cover member being seated on said rim part, said wheel cover member having a pry-off edge formed thereon in proximity to said intermediate annular folded flange but on the opposite side of said member therefrom whereby a pry-off tool may be inserted thereagainst and fulcrumed on said rim part to facilitate the removal of said cover member from said wheel.

6. The combination comprising a wheel having rim and body parts, said rim part including a base flange and said body part including an axially extending flange upon which said base flange is seated and secured, said body part flange extending axially forwardly beyond said base flange of said rim and providing a radially outwardly facing shoulder, said shoulder having a plurality of circumferentially spaced protuberances thereon, and a wheel cover member for disposition on the outer face of said wheel having a generally axially rearwardly projecting flange which is arranged to be sprung over said protuberances to retain said cover member on said wheel by its own inherent resiliency.

7. The combination comprising a wheel having rim and body parts, said rim part including a base flange and said body part including an axially extending flange upon which said base flange is seated and secured, said body part flange extending axially forwardly beyond said base flange of said rim and providing a radially outwardly facing shoulder, said shoulder having an annular ridge-like formation formed thereon and providing a pocket between said shoulder and said base flange of said rim part, and a wheel cover member for disposition on the outer face of said wheel having a rearwardly projecting flange thereon which is arranged to be seated on said rim part, circumferentially spaced portions of the rear edge of said flange of said cover member being depressed obliquely axially rearwardly and radially inwardly and arranged to be sprung over said ridge-like portion of said shoulder whereby said cover member is retained on said wheel.

8. The combination comprising a wheel having rim and body parts, said rim part including a base flange and said body part including an axially extending flange upon which said base flange is seated and secured, said body part flange extending axially forwardly beyond said base flange of said rim and providing a radially outwardly facing shoulder, said shoulder having a radially outwardly projecting annular ridge formed thereon and providing a pocket between said body and rim parts, and a wheel cover member having a rearwardly projecting flange arranged to be sprung over said ridge-like projection on said shoulder into said pocket.

9. A wheel having rim and body parts, said rim part including a base flange and said body part including an axially extending flange upon which said base flange is seated and secured, said body part flange extending axially forwardly beyond said base flange of said rim and providing a radially outwardly facing shoulder, said shoulder having an annular groove formed therein substantially opposite the axially outer end of said base flange of said rim part, said grooved portion of said shoulder and said base flange of said rim part forming a pocket.

10. A wheel having rim and body parts, said rim part including a base flange and said body part including an axially extending flange upon which said base flange is seated and secured, said body part flange extending axially forwardly beyond said base flange of said rim and providing a radially outwardly facing shoulder, said shoulder having a radially outwardly raised annular ridge formed therein and spaced axially forwardly of said base flange of said rim part.

11. The combination comprising a wheel having rim and body parts, said rim part including a base flange and said body part including an axially extending flange upon which said base flange is seated and secured, said body part flange extending axially forwardly beyond said base flange of said rim and providing a radially outwardly facing shoulder, said shoulder having a radially outwardly projecting ridge-like formation formed thereon, and a wheel cover member for disposition on the outer face of said wheel having a rearwardly projecting flange seated on said rim part, circumferentially spaced portions of said wheel cover member flange being bent obliquely axially rearwardly and radially inwardly and arranged to be sprung over said ridge-like formation, and the radial outer edge of said wheel cover member being spaced from said rim part.

12. The combination comprising a wheel and rim and body parts, said rim part including a base flange and said body part including an axially extending flange upon which said base flange is seated and secured, said body part flange extending axially forwardly beyond said base flange of said rim and providing a radially outwardly facing shoulder, said shoulder having radially outwardly projecting means formed thereon and providing a pocket adjacent the junction of said body and rim parts, and a wheel cover member having a rearwardly projecting flange arranged to be sprung over said projecting means on said shoulder into said pocket.

GEORGE ALBERT LYON.